United States Patent
Mestach et al.

(10) Patent No.: US 12,534,634 B2
(45) Date of Patent: Jan. 27, 2026

(54) AQUEOUS COATING COMPOSITION

(71) Applicant: ALLNEX NETHERLANDS, Bergen op Zoom (NL)

(72) Inventors: Dirk Emiel Paula Mestach, Nijlen (BE); Nicole Emile Maria Verhagen, Vogelwaarde (NL); Anne P.M. Van Gorkum, Oosteind (NL); Robert L. Adolphs, Bavel (NL)

(73) Assignee: ALLNEX NETHERLANDS, Bergen op Zoom (NL)

( * ) Notice: Subject to any disclaimer, the term of this patent is extended or adjusted under 35 U.S.C. 154(b) by 1178 days.

(21) Appl. No.: 17/434,248

(22) PCT Filed: Mar. 5, 2020

(86) PCT No.: PCT/EP2020/055819
§ 371 (c)(1),
(2) Date: Aug. 26, 2021

(87) PCT Pub. No.: WO2020/178378
PCT Pub. Date: Sep. 10, 2020

(65) Prior Publication Data
US 2022/0145116 A1    May 12, 2022

(30) Foreign Application Priority Data
Mar. 7, 2019 (EP) ................................ 19161370

(51) Int. Cl.
*C09D 133/08* (2006.01)
*C08F 2/22* (2006.01)
*C08F 220/14* (2006.01)
*C08F 220/18* (2006.01)

(52) U.S. Cl.
CPC ............. *C09D 133/08* (2013.01); *C08F 2/22* (2013.01); *C08F 220/14* (2013.01); *C08F 220/1804* (2020.02)

(58) Field of Classification Search
CPC ...... C09D 133/02; C09D 133/06; C08L 33/02; C08L 33/04; C08L 33/08; C08L 33/10; C08L 2205/025; C08L 2205/02; C08L 2205/03
See application file for complete search history.

(56) References Cited

U.S. PATENT DOCUMENTS

| 4,210,565 A | 7/1980 | Emmons |
| 5,498,659 A | 3/1996 | Esser |
| 5,859,112 A | 1/1999 | Overbeek et al. |
| 5,962,571 A | 10/1999 | Overbeek et al. |
| 6,730,740 B1 | 5/2004 | Mestach et al. |
| 8,013,092 B1 | 9/2011 | Krajnik et al. |
| 2015/0166803 A1 | 6/2015 | Jhaveri et al. |

FOREIGN PATENT DOCUMENTS

| GB | 2503700 | 1/2014 |
| WO | 2013/181068 | 12/2013 |

OTHER PUBLICATIONS

International Search Report (ISR) issued Apr. 24, 2020 in International (PCT) Application No. PCT/EP2020/055819.

*Primary Examiner* — Jeffrey S Lenihan
(74) *Attorney, Agent, or Firm* — Wenderoth, Lind & Ponack, L.L.P.

(57) ABSTRACT

The present invention relates to crosslinkable aqueous vinyl polymer composition comprising from 70 to 97.5 weight % of a crosslinkable oligomer stabilized dispersion PD1 of vinyl polymer P1, PD1 comprising a water-soluble or water-dispersible crosslinkable oligomer OL and at least one high molecular weight vinyl polymer P1 prepared in the presence of the water-soluble or water-dispersible crosslinkable oligomer OL; from 2 to 29.5 weight % of at least one non-oligomer stabilized dispersion PD2 of vinyl polymer P2; and from 0.5 to 28 weight % of at least one crosslinker X, and its use in coating compositions.

18 Claims, No Drawings

AQUEOUS COATING COMPOSITION

The present invention pertains to crosslinkable aqueous vinyl polymer compositions, to a coating composition comprising said crosslinkable aqueous vinyl polymer compositions and to an article coated with the coating composition.

DESCRIPTION OF THE RELATED ART

Recent changes in the legislation concerning the emission of organic solvents have led to a growing interest in water-borne coating systems for industrial and decorative applications. Waterborne coating systems have been used already for a long time in applications where the decorative aspects of the coating are of more importance than the protective properties. The aqueous polymer dispersions that are used as binders in such coatings are often prepared by means of emulsion polymerization processes.

Due to increasingly stringent laws concerning the allowable contents of volatile organic compounds in coatings, major efforts have been made to minimize the use of organic co-solvents in water borne coatings based on acrylic binders. However, in water borne coatings that use vinyl polymers as the main binder, the final hardness is affected by the reduction in the amount of organic co-solvents as the minimal film-formation temperature (MFFT) needs to be lowered. For some coating applications a minimum hardness is required, for example if a high blocking-resistance or mar-resistance is important.

The hardness of a final coating can be increased by introducing a crosslinking mechanism into the coating composition. Introducing a crosslinking mechanism by provision of an oligomer with crosslinking groups and optionally crosslinking groups on the dispersed polymer is a well-known method to improve some of the properties (e.g. water and chemical resistance) of aqueous polymer dispersions when they are used in coating applications. Examples of these products can be found in U.S. Pat. Nos. 5,859,112, 5,962,571 and 5,498,659.

Waterborne ambient to medium temperature crosslinking coating compositions are commonly supplied as either one-package or two-package systems. In a one-package system, the polymer dispersion is pre-combined with a crosslinker, and is sealed in a single package for storage. In two-package systems, the binder and crosslinker are provided to the consumer in separate packets and are mixed by the consumer shortly before application to a substrate. Curing of one-package systems occurs when the coating composition is exposed to an external environment, at ambient temperature or by baking the coating after application at medium temperature, e.g. 50-60° C. In two-package systems, curing occurs upon mixing and hence reaction of the binder and the crosslinker.

Two-package systems suffer from the disadvantage that mixing of the components must be carried out by the consumer requiring accurate measurement and often specialized mixing equipment. One-package systems do not suffer from this disadvantage, but may suffer problems with shelf-life because the crosslinking reactants are in contact in the single package during storage. In order to be used as a one component coating, the composition must be stable, meaning that the reactive components must co-exist in a single composition that is shelf-stable. Often a one-package system makes use of the reaction between carbonyl-groups attached to the polymer with carbonyl-reactive crosslinkers. The carbonyl-groups can be introduced into the polymer by means of carbonyl-functional monomers. Carbonyl-reactive crosslinkers are usually poly-functional amines or amine derivatives such as di- or poly functional hydrazides. In case a hydrazide is used, the hydrazide groups react with carbonyl groups by a condensation reaction to form hydrazone linking bonds between the polymer chains. Water-borne polymer dispersions comprising a crosslinkable oligomer and a polymer based on such crosslinking systems possess a good combination of performance and application properties for use in aqueous coating compositions.

In these coating compositions, crosslinking of the polymers takes place on drying through formation of a Schiff's base. Removal of water from the system, such as by evaporation during air drying, drives the reaction towards the crosslinked product. Since water evaporation drives the reaction, it is possible to cure such compositions at ambient or medium temperatures. However, the use of said coating compositions is sometimes limited because it is not uncommon for these one-package systems to show viscosity-instability upon storage or when formulating them into paint. The viscosity behavior of the formulated paint also affects the application properties of the coating, also referred to as the open time (OT). More particularly, a layer of a coating composition freshly applied to a substrate is said to be open when it is still in a state where it can be manipulated during the curing without leaving substantial visible defects in the cured coating. The open time is the period of time between the point of first application of a coating layer up to the point where corrections can no longer be made in the wet paint film without leaving visible defects (like brush marks, roller marks, spray dust (commonly known as 'overspray') or visible lines at joints between adjacent coating layers).

U.S. Pat. No. 9,365,731 B2 describes a carbonyl-functional emulsion polymer (latex) that is stabilized by a "solid grade oligomer" (SGO) which is used as support polymer. SGOs are alkali-soluble carboxylic acid-functional copolymers that are made by means of a high temperature polymerization. The carbonyl-groups in the latex copolymer can react with the dihydrazide cross-linker. The support polymer however remains thermoplastic unless a carbodiimide cross-linker is added during the ink preparation. As the carbodiimide will already react in the aqueous phase, the viscosity of the coating composition will not be stable.

U.S. Pat. No. 8,013,092 describes an aqueous coating composition consisting of three polymeric species. For the production thereof, conventional non-oligomeric surfactants are used instead of a carbonyl-functional oligomer.

U.S. Pat. No. 6,730,740 describes a vinyl polymer that is polymerized in the presence of a vinyl oligomer, next to their ability to crosslink via the carbonyl-dihydrazide reaction. A third water-soluble tertiary amine functional polymer is added to the composition in order to provide additional ionic crosslinking through the interaction between the carboxylic acid on the oligomer stabilized polymer dispersion and the tertiary amine groups on the water-soluble polymer.

U.S. Pat. No. 4,210,565 describes the addition of pre-formed hydrazones as crosslinkers, to a composition. This method is not attractive as the hydrazones must be prepared separately, and their solutions (in ketones or ketone/water mixtures) must avoid high solids contents to prevent crystallization. In GB2503700, included entirely as a reference, a coating composition is described comprising a crosslinkable oligomer and a polymer where the carbonyl reactive crosslinker is a dihydrazide. Even though the use of hydrazone crosslinker results in improved viscosity stability, the coating composition will release volatile organic solvents upon drying because of the de-blocking of the hydrazone, which is not desirable.

Thus there is a general need for aqueous coating compositions that in addition to providing high hardness coatings with good chemical resistance and low MFFT, offer better viscosity stability and application properties than currently provided for in the art.

Surprisingly we now have found that the addition of a non-oligomer stabilized polymer dispersion to a self-crosslinking oligomer stabilized dispersion overcomes above mentioned problems and has a pronounced effect on the viscosity stability and application properties of the resulting composition. Furthermore improvements have been found in the performance of the resulting coating compositions such as the retention of gloss and early water resistance.

DETAILED DESCRIPTION OF THE COATING COMPOSITION

The present invention therefore relates to a crosslinkable aqueous vinyl polymer composition comprising:
a) from 70 to 97.5 weight % of a crosslinkable oligomer stabilized dispersion PD1 of vinyl polymer P1, PD1 comprising, based on the weight solids of polymer in PD1 (or, based on the polymer weight of vinyl polymer dispersion PD1):
  i) from 20 to 60 weight % on polymer solids in PD1 of a water-soluble or water-dispersible crosslinkable oligomer OL obtained by emulsion polymerizing a monomer mixture comprising:
    1) at least one acid functional ethylenically unsaturated monomer M1,
    2) at least one ethylenically unsaturated monomer M2 with functionality for crosslinking upon film-formation, other than M1,
    3) at least one ethylenically unsaturated monomer M3 other than M1 and M2,
    4) optionally, one or more multifunctional ethylenically unsaturated monomers M4 for pre-crosslinking, and
  ii) from 40 to 80 weight % on polymer solids in PD1 of at least one high molecular weight vinyl polymer P1 prepared by emulsion polymerizing, in the presence of the water-soluble or water-dispersible crosslinkable vinyl oligomer OL, a monomer mixture comprising:
    1) optionally at least one acid functional ethylenically unsaturated monomer M1',
    2) optionally one or more ethylenically unsaturated monomers M2' with functionality for crosslinking upon film-formation, other than M1',
    3) at least one ethylenically unsaturated monomer M3' other than M1' and M2', and
    4) optionally, one or more multifunctional ethylenically unsaturated monomers M4' for pre-crosslinking, preferably in an amount less than 5 weight %,
  wherein the sum of i) and ii) is 100 wt %,
b) from 2 to 29.5 weight % of at least one non-oligomer stabilized dispersion PD2 of vinyl polymer P2, PD2 obtained by emulsion polymerizing a monomer mixture comprising:
  1) at least one acid functional ethylenically unsaturated monomer M1",
  2) optionally one or more ethylenically unsaturated monomers M2" with functionality for crosslinking upon film-formation, other than M1",
  3) at least one ethylenically unsaturated monomer M3" other than M1" and M2", and
  4) optionally, one or more multifunctional ethylenically unsaturated monomers M4" for pre-crosslinking, preferably in an amount less than 5 weight %,
  5) optionally, in the presence of a conventional non-oligomeric, non crosslinkable surfactant, optionally a copolymerizable surfactant,
c) from 0.5 to 28 weight % of at least one crosslinker X reactive with the functional groups of monomers M2 of OL and optionally with the functional groups of monomers M2' of P1 and/or M2" of P2,
based on the total weight of a), b) and c), wherein the total weight of a), b) and c) is 100 wt % (i.e. wherein the sum of a), b) and c) is 100 wt %) of the crosslinkable aqueous vinyl polymer composition.

By "ethylenically unsaturated monomer" or "vinyl monomer" is meant in the present invention a monomer having at least one carbon-carbon double bond which can undergo free-radical polymerization.

The prefix "(meth)acryl" when used to name compounds of the present invention encompasses both "acryl" and "methacryl" and refers to compounds comprising at least one $CH_2=CHC(OO-$ group or $CH_2=CCH_3CO)O-$ group, as well as mixtures thereof and mixtures of such compounds.

By "oligomer" is meant a low molecular weight polymer that is obtained by means of the free-radical polymerization of ethylenically unsaturated monomers.

By "vinyl polymer" is meant a polymer that is obtained by means of the free-radical polymerization of ethylenically unsaturated monomers.

Acid functional ethylenically unsaturated monomers M1, M1' and M1" can, each independently, be selected from the group of carboxylic acid functional monomers such as acrylic acid, methacrylic acid, maleic acid or its half-esters, fumaric acid or its half esters, and itaconic acid or its half esters. These monomers may be produced from petrochemical feedstock. Alternatively they may be derived from renewable feedstock. Bio-based acrylic acid can be produced from glycerol or hydroxypropionic acid, hydroxypropionic acid derivatives, or mixtures thereof. Itaconic acid is obtained by fermentation of sugars and bio-based methacrylic acid can be derived from itaconic acid.

Other acid-functional, non-carboxylic group-containing monomers can for example be sulphate or sulphonic monomers. As non-limiting examples can be mentioned: 2-acrylamido-2-methylpropane sulphonic acid or the alkali, ammonia or amine salt thereof and the sodium salt of the adduct of allylglycidyl ether to sodium bisulphite, 2-sulfoethyl methacrylate or 1-(allyloxy)-2-hydroxypropane-1-sulfonic acid. Also phosphate or phosphonate functional monomers can be used. Non-limiting examples of such monomers are: monoacryloxyethyl phosphate, Sipomer® PAM-100 and Sipomer® PAM-200 (both from Solvay Novecare), 10-Methacryloyloxydecyl dihydrogen phosphate (Kuraray), dimethyl (2-methacryloyloxyethyl)phosphonate and dimethyl(2-methacryloyloxypropyl)phosphonate or ethyl 2-[4-(dihydroxyphosphoryl)-2-oxabutyl] acrylate.

To enhance the stability of the obtained dispersions during the polymerization process it may be advantageous for the carboxylic acid to be partially present in the salt form through neutralization with ammonia, inorganic bases such as alkali hydroxides, e.g., lithium hydroxide, potassium hydroxide or sodium hydroxide, or organic amines, such as N,N-dimethyl ethanolamine, N,N-diethyl ethanolamine, triethyl amine, and morpholine. M1, M1' and M1" can be the same or different.

Acid functional ethylenically unsaturated monomers M1, M1' and M1" are preferably, each independently, selected from the group of carboxylic acid functional monomers, more preferably from acrylic acid and methacrylic acid, and mixtures thereof.

Monomers M2, M2' ad M2" having functionality for crosslinking upon film-formation can be ketone, aldehyde or acetoacetyl functional. Examples of monomers which bear carbonyl functional groups include acrolein, methacrolein, crotonaldehyde, 4-vinylbenzaldehyde, vinyl alkyl ketones of 4 to 7 carbon atoms such as vinyl methyl ketone. Further examples include acrylamido pivalaldehyde, methacrylamido pivalaldehyde, 3-acrylamidomethyl-anisaldehyde, diacetone acrylate and diacetone methacrylate, and keto-containing amides such as diacetone acrylamide. Monomers possessing an acetoacetoxy functional group can also be used. Examples of such monomers are acetoacetoxyethyl methacrylate, acetoacetoxyethyl acrylate, acetoacetoxyethyl methacrylate, acetoacetoxypropyl acrylate, allyl acetoacetate, acetoacetamidoethyl (meth)acrylate and acetoacetoxybutyl acrylate. In a preferred embodiment the monomer M2, M2' and, respectively M2", are, each independently, selected from acetoacetoxyethyl methacrylate and diacetone acrylamide, or mixtures thereof. In a particularly preferred embodiment the monomer M2, is acetoacetoxyethyl methacrylate or diacetone acrylamide.

The preferred functional groups of monomer M2, respectively M2' and M2", are preferably carbonyl or acetoacetate groups.

M2, M2' and M2" can be the same or different.

Monomers M3, M3' and M3", each independently, are usually ethylenically unsaturated monomers which may include but are not limited to olefinically unsaturated vinyl monomers such as styrene, alpha-methyl styrene (or other styrene derivatives such as t-butylstyrene, vinyl toluene, o-, m-, and p-methylstyrene, o-, m-, and p-ethylstyrene), acrylonitrile, methacrylonitrile, vinyl halides such as vinyl chloride, vinylidene halides such as vinylidene chloride, vinyl esters such as vinyl acetate, vinyl propionate, vinyl laurate; vinyl esters of versatic acid such as VeoVa™ 9 and VeoVa™ 10 (VeoVa™ is a trademark of Hexion), heterocyclic vinyl compounds; alkyl esters of mono-olefinically unsaturated dicarboxylic acids such as di-n-butyl maleate and di-n-butyl fumarate; esters of itaconic acid such as dimethyl or dibutyl itaconate and in particular, esters of acrylic acid and methacrylic acid of formula $CH_2=CR1\text{-}COOR2$ wherein R1 is H or methyl and R2 is optionally substituted C1 to C20, more preferably C1 to C8, alkyl, cycloalkyl, aryl or (alkyl)aryl which are also known as acrylic monomers, examples of which are methyl (meth)acrylate, ethyl (meth)acrylate, butyl (meth)acrylate (all isomers), 2-ethylhexyl (meth)acrylate, isopropyl (meth)acrylate, propyl (meth)acrylate (all isomers), and hydroxyalkyl (meth)acrylates such as hydroxyethyl (meth)acrylate, 2-hydroxypropyl (meth)acrylate, 4-hydroxybutyl (meth)acrylate and their modified analogues like Tone™ M-100 (Toner™ is a trademark of DowDuPont). Polyethyleneglycol or mono-alkoxy ethylene glycol modified (meth)acrylic esters can also be used, such as ethyl triglycol methacrylate, methoxypolyethylene glycol 350 methacrylate, methoxypolyethylene glycol 750 methacrylate, methoxypolyethylene glycol 1000 methacrylate, methoxypolyethylene glycol 2000 methacrylate, methoxypolyethylene glycol 5000 methacrylate (all supplied by Evonik under the tradename VISIOMER® and by BASF under the trademark Bisomer®). N-substituted compounds of acrylamide and methacrylamide such as N-tert.butyl acrylamide, N-tert.hexyl acrylamide, N-tert.octyl acrylamide, N-(1,5-dimethyl-1-ethyl)hexyl acrylamide, N-(1,1-dimethyl-2-phenyl)ethyl acrylamide, N-cyclohexyl acrylamide, N-(1-methylbutyl)acrylamide, N-ethyl acrylamide, N-ethylhexyl acrylamide, N-butyl methacrylamide, and N-cyclohexyl methacrylamide can also be used. Monomers M3, M3' and M3" can also comprise adhesion promoting monomers. These monomers usually contain amino, ureido or N-heterocyclic groups. Examples of such monomers are dimethyl aminoethyl(meth)acrylate, diethyl aminoethyl(meth)acrylate, 3-dimethylamino-2,2-dimethylpropyl-1-(meth)-acrylate, N-dimethylaminomethyl(meth)acrylamide, N-(4-morpholinomethyl) (meth)acrylamide, 1-vinyl imidazole, and N-vinyl pyrrolidone. Further mention may be made of compounds having a pyrrolidine, piperidine, morpholine, piperazine, imidazole, pyrrolidin-(2)-one or imidazolidin-2-one (ethylene urea) ring. In this case preference is given to ureido-functional monomers such as N-(2-methacryloxyethyl)ethylene urea, 1-(2-(3-allyloxy-2-hydroxypropylamino) ethyl)-imidazolidin-2-one, and 2-ethyleneureidoethyl methacrylate.

The M3, M3' and M3" monomers may be produced from petrochemical feedstock. Alternatively they may be derived from renewable feedstock such as bio-based acrylic and methacrylic acid. The alkanols used in the (trans)esterification can also be bio-derived. Non-limiting examples of such monomers are Visiomer® Terra C13-MA, Visiomer® Terra C17.4-MA, n-octyl acrylate and isobornyl (meth) acrylate. Also dienes such as 1,3-butadiene, or isoprene, or mixtures thereof. Also, vinyl esters, such as vinyl acetate, vinyl alkanoate or their derivatives, or mixtures thereof can be used in the monomer composition.

Monomers M3, M3' and M3" are more preferably, each independently, selected from vinyl monomers; in particular styrene; esters of acrylic acid and methacrylic acid of formula $CH_2=CR1\text{-}C(O)OR2$ wherein R1 is H or methyl and R2 is optionally substituted C1 to C20, more preferably C1 to C8, alkyl, cycloalkyl, aryl or (alkyl)aryl; and mixtures thereof.

M3, M3' and M3" can be the same or different.

Monomers M4, M4' and M4", each independently, are usually selected from multi-functional monomers having two or more ethylenically unsaturated groups per molecule, and may be present in monomer compositions of OL, P1 and P2. Examples of such monomers are 1,3-butadiene, isoprene, divinyl benzene, triallyl cyanurate, vinyl or allyl acrylate or methacrylate, diol diacrylates and diol dimethacrylates, and methylene bisacrylamide or methylene bismethacrylamide. Use of multi-functional monomers during an emulsion polymerization will result in increased molecular weight of the polymer or partial cross linking during the polymerization. The amount of monomers M4 in the oligomer OL is preferably less than 1 weight %, more preferably no monomer M4 is present in oligomer OL. The amount of monomer M4' present in vinyl polymer P1 is preferably from 0.1 to 5 weight %. The amount of monomer M4" present in vinyl polymer P2 is preferably less than 5 weight %, The monomers M1, M1', M1" M2, M2', M2", M3, M3', M3", M4, M4' and M4" can be of petrochemical origin or may also be fully or partially derived from bio-mass. In case monomers derived from bio-mass are being used, the bio-based carbon content of the polymer can be determined by means of radiocarbon analysis according to the European Standard EN 16785-1.

The crosslinkable oligomer OL is preferably an acid-functional oligomer built from monomers M1, M2 and M3.

The crosslinkable oligomer OL preferably has a number average molecular weight $M_n$ within the range of from 500 g/mole to 50,000 g/mole, more preferably 2,500 g/mole to 25,000 g/mole and most preferably 5,000 g/mole to 15,000 g/mole. The number and weight average molecular weights ($M_n$ and $M_w$) of the oligomer OL may be determined by using gel permeation chromatography (GPC) according to ISO 13885-1:2008, ASTM D 3536 and ASTM D 3593.

The crosslinkable oligomer OL preferably has a glass transition temperature (Tg) within the range of 10 to 150° C., more preferably 20 to 125° C. and most preferably 25 to 115° C. The Tg of oligomer OL, vinyl polymer P1 (or P1A, P1B, etc., vide infra) and P2 herein stands for the calculated glass transition temperature and is well known to be the temperature at which a polymer changes from a glassy, brittle state to a rubbery state. Tg values may be calculated using the well-known Fox equation (T. G. Fox, Bull. Am. Phys. Soc. 1, 123 (1956)), which is well known in the art, and is represented by the formula:

$$1/Tg = W1/Tg(1) + W2/Tg(2) + W3/Tg(3) + \ldots$$

wherein W1, W2, W3, etcetera, are the weight fractions of the comonomers (1), (2), and (3), (etcetera), and Tg(1), Tg(2), Tg(3) are the glass transition temperatures of their respective homopolymers. Glass transition values for homopolymers given in the Polymer Handbook, 4th edition (editors: J. Brandrup, E. H. Immergut, E. A. Grulke, John Wiley & Sons, Inc. 1999) are used to perform the calculation. The calculated Tg in degrees Kelvin may be readily converted to degrees Celsius.

The crosslinkable oligomer OL is preferably derived from a monomer system comprising 1-45 weight % of monomer(s) M1, 0.5 to 20 weight % of crosslinking monomer(s) M2, and 98.5-50 weight % of non-acid functional, non-crosslinking monomer(s) M3 different from M1 and M2, and said acid functionality rendering the oligomer water-soluble per se or by neutralization.

The oligomer OL preferably has an acid number of at least 45 mg KOH/g, more preferably at least 50 mg KOH/g and most preferably at least 55 mg KOH/g.

Methods to influence the molecular weight in emulsion polymerization in order to achieve the desired number average molecular weight are well known to those skilled in the art. Molecular weight control of the oligomer OL may be provided by using chain-transfer agents such as mercaptans and halogenated hydrocarbons. Suitable mercaptans include as n-dodecyl mercaptan, n-octyl mercaptan, t-dodecyl mercaptan, mercapto ethanol, iso-octyl thioglycolurate, C2 to C8 mercapto carboxylic acids and esters thereof such as 3-mercaptopropionic acid and 2-mercaptopropionic acid.

The crosslinkable oligomer OL may be prepared by any known technique and may include directly synthesizing the oligomer in an aqueous process, i.e. in the presence of water (for example by emulsion polymerization, suspension polymerization, micro-suspension polymerization or mini emulsion polymerization), or by solution polymerization where the solvent may be water or any organic solvent that is miscible with water or that is removed by distillation after the oligomer is transferred to water. When the oligomer is a vinyl macro-monomer, it may be prepared by a number of processes including but not limited to the use of reversible addition fragmentation (RAFT) agents, by the use of catalytic chain transfer agents such as the cobalt-chain transfer. Also alpha-methyl styrene dimer or oligomers of alpha-methyl styrene dimer can be used as explained in US 2007/0043156 A1 and U.S. Pat. No. 6,872,789. Yet another method to synthesize polymer with a well-defined molecular weight is the use of diarylethene such as diphenylethene, or high temperature processes.

Preferably the oligomer OL is prepared by solution polymerization, emulsion polymerization or suspension polymerization. Preferably the oligomer is prepared by an aqueous process. Preferably the continuous phase of the aqueous process comprises >50 weight %, more preferably >80 weight % and most preferably >95 weight % of water.

Most preferably the oligomer OL is prepared by an aqueous free radical emulsion polymerization process. This process is described in "Chemistry and Technology of Emulsion Polymerisation", Editor A. M. van Herk, (2005), Blackwell Publishing Ltd.

The free radical polymerization may be carried out as a batch or as a semi-continuous polymerization process.

A free-radical emulsion polymerization will usually require the use of free-radical-yielding initiator to initiate the polymerization. Suitable free-radical-yielding initiators include inorganic peroxides such as K, Na or ammonium persulphate, hydrogen peroxide, or percarbonates; organic peroxides, such as acyl peroxides including e.g. benzoyl peroxide, alkyl hydroperoxides such as t-butyl hydroperoxide and cumene hydroperoxide; dialkyl peroxides such as di-t-butyl peroxide; peroxy esters such as t-butyl perbenzoate and the like; mixtures may also be used. The peroxy compounds are in some cases advantageously used in combination with suitable reducing agents (redox systems) such as Na or K pyrosulphite or bisulphite, and iso-ascorbic acid. Metal compounds such as Fe. EDTA (EDTA is ethylene diamine tetra acetate) may also be used as part of the redox initiator system. Azo functional initiators may also be used such as azobis(isobutyronitrile), 2,2'-azo-bis(2-methyl butane nitrile) (ANBN); and 4,4'-azobis(4-cyanovaleric acid). It is possible to use an initiator system that partitions between the aqueous and organic phases, e.g. a combination of t-butyl hydroperoxide, iso-ascorbic acid and Fe. EDTA. The amount of initiator or initiator system to use is conventional, e.g. within the range 0.05 to 6 weight % based on the total vinyl monomer(s) used. Preferred initiators for preparing the crosslinkable oligomer OL include ammonium persulphates, sodium persulphates, potassium persulphates, azobis(isobutyronitrile) and/or 4,4'-azobis(4-cyanovaleric acid). Most preferred initiators for preparing the crosslinkable oligomer OL include redox systems and persulphates as described above. A further amount of initiator may optionally be added at the end of the polymerization process to assist the removal of any residual vinyl monomers.

If the crosslinkable oligomer OL is made by means of emulsion polymerization, surfactants can be utilized in order to stabilize the vinyl copolymer in water (even if it is self-dispersible). Suitable surfactants are ionic or non-ionic surfactants. Examples of anionic emulsifiers are: potassium laurate, potassium stearate, potassium oleate, sodium decyl sulphate, sodium dodecyl sulphate, and sodium rosinate. Examples of non-ionic emulsifiers are: linear and branched alkyl and alkylaryl polyethylene glycol ethers and thioethers and linear and branched alkyl and alkylaryl polypropylene glycol ethers and thioethers, alkylphenoxypoly(ethylenoxy) ethanols such as the adduct of 1 mole of nonylphenol to 5-50 moles of ethylene oxide, or the alkali salt or ammonium salt of the sulphate or the phosphate of said adduct.

Also surfactants containing an olefinically unsaturated group that can participate in a free radical polymerization can be used. Suitable polymerizable surfactants include hemi-esters of maleic anhydride of the formula $M^+$. OOC—CH=CHCOOR wherein R is C6 to C22 alkyl and $M^+$ is Na+, K+, Li+, NH4+, or a protonated or quaternary amine. Polyoxyethylene alkylphenyl ethers with an ethylenically unsaturated bond sold under the tradename Noigen® RN (supplied by Montello, Inc.) such as NOIGEN® RN-10, NOIGEN® RN-20, NOIGEN® RN-30, NOIGEN® RN-40, and NOIGEN® RN-5065 or the sulphate thereof sold under the tradename Hitenol® BC (supplied by Montello, Inc.) such as HITENOL® BC-10, HITENOL® BC-1025, HITENOL® BC-20, HITENOL® BC-2020, HITENOL® BC-30. MAXEMUL™ 6106 (available from Croda Industrial Specialties), which has both phosphonate ester and ethoxy hydrophilicity, a nominal C18 alkyl chain with an acrylate reactive group. Other representative reactive surfactants with phosphate ester functionalities suitable for such reactions include, but are not limited to, MAXEMUL™ 6112, MAXEMUL™ 5011, MAXEMUL™ 5010 (all available from Croda Industrial Specialties). Alternative reactive surfactants suitable for use with various embodiments of the present invention include sodium allyloxy hydroxypropyl sulphonate (available from Solvay as SIPOMER™ COPS-1), ADEKA REASOAP® SR/ER series such as ADEKA REASOAP® ER-10, ER-20, ER-30 and ER-40, AKEDA REASOAP® SR-10, SR-20, SR-30 (all available from ADEKA Corporation) and allylsulphosuccinate derivatives such as TREM™ LT-40 (sodium dodecyl allyl sulfosuccinate available from Henkel).

The amount of surfactant used in the synthesis of the oligomer OL is preferably 0 to 15 weight %, more preferably 0 to 8 weight %, still more preferably 0 to 5 weight %, especially 0.1 to 3 weight % and most especially 0.2 to 2 weight %.

Preferably the vinyl polymer P1 is prepared in an aqueous process in the presence of the crosslinkable oligomer OL. Prior to the polymerization of the monomers building the vinyl polymer P1, the crosslinkable oligomer OL may be partially or completely solubilized. Most preferably the vinyl polymer P1 is prepared by an aqueous emulsion polymerization process.

The process for preparing the vinyl polymer P1 may be carried out in a number of modes including but not limited to polymerizing all of the oligomer OL and monomers M3' and, optionally M1' and/or M2' and/or M4', in one batch, pre-charging the oligomer OL to a reactor and subsequently feeding in the monomer or monomers or monomer mixtures (which may be the same or different), in one or more stages and/or using a gradient feeding technique (or vice versa), feeding both oligomer OL and monomers to a reactor (optionally pre-charged with some oligomer), preparing a polymer by feeding the monomers to the oligomer OL which is simultaneously fed into a reactor (optionally pre-charged with some oligomer) or continuously feeding a mixture of oligomer OL and monomers into a reactor.

The vinyl polymer P1 is preferably derived from a monomer system comprising 0 to 5 weight of monomer(s) M1', 0 to 10 weight % of crosslinking monomer(s) M2', 80 to 100 weight of non-acid functional, non-crosslinking monomer(s) M3' different from M1' and M2', and 0 to 5, more preferably 0.1 to 5, weight % of monomer M4'.

Preferably the free-radical polymerization to obtain vinyl polymer P1 is effected by heating the reactor contents to a temperature in the range of from 30° C. to 100° C. and more preferably in the range of from 50° C. to 90° C.

Vinyl polymer P1 preferably has an average glass transition temperature (Tg) between −70° C. and 50° C., more preferably from −25° C. to 40° C. The Tg of the vinyl polymer P1 is preferably at least 25° C., more preferably at least 40° C. below the Tg of the oligomer OL.

The number average molecular weight of vinyl polymer P1 is preferably higher than 60,000 g/mole, preferably higher than 100,000 g/mole (determined according to ASTM D3536 and ASTM D3593).

According to a preferred embodiment of the invention, the crosslinkable oligomer stabilized dispersion PD1 of vinyl polymer P1 comprises more than one high molecular weight vinyl polymer P1 such as described here above in relation with vinyl polymer P1, hereafter called P1A, P1B, etc.

In this embodiment, the crosslinkable oligomer stabilized dispersion PD1 of vinyl polymer P1 preferably comprises a high molecular weight vinyl polymer P1A and a high molecular weight vinyl polymer P1B which is different from P1A, more preferably having a different monomer composition. In this embodiment it is most preferred that the vinyl polymer P1A has a calculated Tg which is different from the calculated Tg of vinyl polymer P1B, more particularly a difference in calculated Tg of at least 40° C., more preferably at least 50° C. (Tg calculated using the Fox equation, vide supra).

The vinyl polymer P1A is preferably derived from a monomer system comprising 0 to 5 weight of monomer(s) M1', 0 to 10 weight % of crosslinking monomer(s) M2', 80 to 100 weight of non-acid functional, non-crosslinking monomer(s) M3' different from M1' and M2', and 0 to 5, more preferably 0.1 to 5, weight % of monomer M4'.

The vinyl polymer P1B is preferably derived from a monomer system comprising less than 5, more preferably less than 1, most preferably 0, weight % of monomer(s) M1', less than 5, more preferably less than 1, most preferably 0, weight % of monomer(s) M2', 90 to 100, more preferably 95 to 100, most preferably 98 to 100, weight % of non-acid functional, non-crosslinking monomer(s) M3' different from M1' and M2, and 0 weight % of monomer M4'.

Particularly preferred is a vinyl polymer P1B derived from M3' monomers only, more specifically homopolymers of a monomer M3'.

The crosslinking oligomer stabilized dispersion PD1 of vinyl polymer P1 comprising the oligomer OL is under the form of an aqueous polymer dispersion PD1.

The dispersion PD1 comprises from 20 to 60 weight % oligomer OL on polymer solids, preferably from 25 to 55 weight % OL on polymer solids and most preferably from 25 to 52.5 weight % OL on polymer solids.

The solids content of the aqueous dispersion PD1 is preferably within the range of from 20 to 60 weight % and most preferably within the range of from 30 to 50 weight %.

Vinyl polymer P2 and the dispersion PD2 of vinyl polymer P2 are obtained by emulsion polymerization comprising monomers M1" and M3" and optionally monomers M2" and/or M4" using any techniques known in the art. Vinyl polymer P2 is not a crosslinkable oligomer stabilized vinyl polymer such as P1, but is stabilized by conventional non-oligomeric, non crosslinkable, optionally copolymerizable surfactants as explained above. Vinyl polymer P2 is more preferably obtained under the form of an aqueous polymer dispersion PD2 that consists of discrete particles of vinyl polymer P2 that are insoluble in the aqueous phase, more particularly, vinyl polymer P2 is (substantially) water-insoluble.

The vinyl polymer P2 preferably has an acid value below 50 mg KOH/g, more preferably has an acid value below 40 mg KOH/g.

Particles in polymer dispersion PD2 can have different morphologies such as homogeneous, core-shell or gradient, such as described in EP 0 927 198 B1 and EP 1125 949 B1 both included here as reference. They can have a one or multiple glass transition temperatures, or one very broad transition as is the case in the gradient process. They can either be thermoplastic or (self) crosslinking.

According to a preferred embodiment of the present invention, vinyl polymer P2 contains more than 2.5 weight % of monomer M2", has a (calculated) glass-transition temperature Tg between −35° C. and 75° C. (Tg calculated using the using the Fox equation, vide supra), a particle size of at most 100 nm (Z-average mean according to ISO13321), a number average molecular weight of at least 100,000 g/mole (according to ASTM D3536 and ASTM D3593) and a MFFT below 10° C. (according to ASTM D2354-10).

According to another preferred embodiment of the invention, the vinyl polymer P2 has a (calculated) glass-transition temperature of at least 80° C. (Tg calculated using the using the Fox equation, vide supra), a particle size of at most 100 nm (Z-average mean according to ISO13321), a number average molecular weight of at least 100,000 g/mole (according to ASTM D3536 and ASTM D3593) and is not film-forming at ambient temperature.

According to yet another preferred embodiment, the vinyl polymer P2 has a (calculated) glass-transition temperature Tg between 0 and 100° C. (Tg calculated using the using the Fox equation, vide supra), a number average molecular weight of 4,000 to 50,000 g/mole, more preferably of 5,000 to 50,000 g/mole (according to ASTM D3536 and ASTM D3593), contains between 6 and 10 wt % of monomer M2", and has a particle size between 100 and 200 nm (Z-average mean according to ISO13321).

Optionally dispersion PD2 can be a hybrid polymer dispersion containing also a non-vinyl polymer such as an alkyd, polyester or polyurethane. A review of possible particle morphologies is given by A. Overbeek in J. Coat. Technol. Res., 7 (1) 1-21, 2010.

The solids content of the aqueous dispersion PD2 is preferably within the range of from 20 to 60 weight % and most preferably within the range of from 30 to 50 weight %.

The crosslinker X reactive with the functional groups of monomers M2 in OL and optionally M2' and M2" in, respectively, vinyl polymer P1 and vinyl polymer P2, are preferably di- or polyamines or di- or polyhydrazides, or mixtures thereof. Examples of diamines are aliphatic or cycloaliphatic amines having 2 to 10 primary and/or secondary amino groups and 2 to 100 carbon atoms. Suitable polyfunctional amines include but are not limited to hexamethylene diamine; 2-methyl pentamethylene diamine; 1,3-diamino pentane; dodecane diamine; 1,2-diamino cyclohexane; 1,4-diamino cyclohexane; para-phenylene diamine; 3-methyl piperidine; isophorone diamine; bis-hexamethylene triamine; diethylene triamine; and combinations thereof. Other polyfunctional amines, which are suitable, include those containing adducts of ethylene and propylene oxide, such as the "JEFFAMINE®" series D, ED and T of the Huntsman Chemical Company.

Example of acid dihydrazides include, but are not limited to carbonohydrazide, oxalic acid dihydrazide, malonic acid dihydrazide, succinic acid dihydrazide, glutaric acid dihydrazide, adipic acid dihydrazide, sebacic acid dihydrazide, maleic acid dihydrazide, fumaric acid dihydrazide, itaconic acid dihydrazide, phthalic acid dihydrazide, or terephthalic acid dihydrazide. Alternatively, the crosslinking agent can be a water-soluble aliphatic dihydrazine, such as ethylene-1,2-dihydrazine, propylene-1,3-dihydrazine, and butylene-1,4-dihydrazine, or a polyamine such as isophorone diamine or 4,7-dioxadecane-1,10-diamine. Most preferred is adipic acid dihydrazide.

The crosslinkable aqueous coating composition is preferably prepared by blending an aqueous polymer dispersion PD1 comprising the oligomer stabilized vinyl polymer P1 with an aqueous dispersion PD2 comprising the vinyl polymer P2 particles.

The crosslinker X can be added to PD1 and optionally PD2 prior to blending or after blending of PD1 with PD2.

The amount of crosslinker X is preferably such that the equivalence ratio of functional groups provided by monomer M2 in oligomer OL, and optionally, by monomer M2' and/or monomer M2" of respectively vinyl polymer P1 and vinyl polymer P2, to crosslinker functional groups is from 0.5 to 10, more preferably from 0.75 to 5 and most preferably from 0.95 to 2.5.

The aqueous composition according to the invention permits to obtain coatings with very good decorative, protective and mechanical properties, in particular permit to obtain coatings providing high hardness, as well as good chemical resistance, in particular early water resistance and gloss retention. The aqueous composition according to the invention has a low MFFT and have a better viscosity stability and application properties than currently provided for in the art.

The crosslinkable aqueous vinyl polymer composition has usually a minimal film-formation temperature (MFFT) ranging from 0° C. to 50° C., preferably from 5° C. to 50° C., more preferably from 5° C. to 25° C. and most preferably from 5° C. to 15° C.

The solids content of the aqueous composition of the invention is preferably within the range of from 20 to 60 weight % and most preferably within the range of from 30 to 50 weight %.

If desired the aqueous composition of the invention can be used in combination with other aqueous polymer compositions which are not according to the invention. Examples of such aqueous polymer compositions include water-reducible alkyds, alkyd emulsions, water-reducible polyesters or polyester emulsions, polyurethane dispersions or epoxy dispersions. Furthermore the composition of the invention is particularly suitable for use in coatings or coating compositions. Such coating compositions can be pigmented or unpigmented.

The aqueous composition of the present invention may be applied to a variety of substrates including wood, board, metals, stone, concrete, glass, cloth, leather, paper, plastics, foam and the like, by any conventional method including brushing, rolling, dipping, flow coating, spraying, flexographic printing, gravure printing, ink-jet printing, any other graphic arts application methods and the like.

Accordingly, in a further embodiment of the invention there is provided a coating, a polymeric film, a printing ink and/or an overprint lacquer obtainable from an aqueous composition of the present invention. It has also been found that the aqueous composition of the invention is suitable for use as an adhesive, accordingly there is also provided an adhesive obtainable from an aqueous composition of the present invention. Types of adhesives include pressure sensitive adhesives, contact and laminating adhesives.

Accordingly, in a further embodiment of the invention there is provided a coating composition or a paint comprising at least one aqueous composition according to the invention as described here above and at least one or more conventional ingredients selected from pigments, dyes, emulsifiers, surfactants, plasticizers, thickeners, heat stabilizers, levelling agents, anti-cratering agents, fillers, sedimentation inhibitors, UV absorbers, antioxidants, drier salts, organic co-solvents, wetting agents and the like, and mixtures thereof. Those ingredients can be introduced at any stage of the production process of the aqueous composition or subsequently.

Optionally an additional external crosslinking agent may be added to the aqueous composition of the invention to aid crosslinking during or after drying. External crosslinking agent include polyisocyanates, amino resins such as melamine- and ureum formaldehyde resins, polyaziridines, carbodimides, epoxy resins and solutions of transition metal salts such as zinc or zirconium ammonium carbonate.

The aqueous composition according to the invention is therefore particularly suitable for decorative and protective applications, in particular for coating wood substrates.

EXAMPLES

The examples which follow illustrate the invention without limiting it.

Test Methods

The molecular weight and molecular weight distribution was determined using size exclusion chromatography according to ASTM D 3536 and ASTM D 3593.

The size-exclusion apparatus used is an Alliance system consisting of a pump, auto-sampler and He-degasser (Degasys DG-1210 from Uniflows), equipped with a PLgel 5 μm MIXED-C 600×7.5 mm Column and a PLgel 5 μm guard column (50×7.5 mm—Polymer Laboratories). The Column oven (Separations Analytical Instruments) 5 was set at 30° C. Tetrahydrofuran (THF—Extra Dry, Biosolve 206347)+ 2% acetic acid (Baker 6052) is used as eluent at a flow-rate of 0.8 ml/min. Carbon disulfide (Backer) is used as a marker. A Waters 410 refractive index is used as detector. The injection Volume is 100 μl at a concentration of 1.5 mg/ml. Polystyrene standards (Polymer Laboratories, Easical PS-1, 2010-0501 (molecular weight range 580 g/mol-8.500.000 g/mol) and Easical PS-2, 2010-0601 (molecular weight range 580 g/mol-400.000 g/mol)) were used for calibration using a third order polynomial. Software used for data-analysis is Empower (Waters).

Minimum film-formation temperature (MFFT) was determined according to ASTM D2354-10(2018) by using a Rhopoint MFFT-Bar 60 which has a temperature range from 0° C. to 60° C. Films were applied with a wet film thickness of 25 microns. The MFT was the lowest temperature at which the film showed no cracks.

Particle size was determined by dynamic light scattering using a Malvern Zetasizer model Nano-S90. The Z-average value (or Z-average mean, or z-average diameter) was reported as the particle size. The z-average diameter is the mean hydrodynamic diameter and is calculated according to the International Standard on dynamic light scattering ISO 13321.

Determination of pH was done according to ISO 976

Brookfield viscosity is measured with a Brookfield RVT viscometer at a temperature of 23±1° C., according to ISO 2555-1974.

Determination of high shear viscosity is done according to DIN 53019 Part 1.

Determination of solids content is done according to ISO 3251: 2008 (E)

Determination of transparency value of the polymer dispersion: The clarity of the polymer dispersion is determined by measuring the transparency of the dispersion using a LICO 200 spectrophotometer (HACH LANGE). The LICO 200 spectrophotometer measures the transmittance of samples within the range 380-720 nm with the application of standard light C (as defined in DIN standard 5033). The transmittance (T) is the ratio I/10 of the intensity of the light emerging from the sample over the intensity of the incident radiation (10). The transmittance can be expressed as a transparency value $dL=T*100$ where $dL=100$ is clear and $dL=0$ is opaque. The spectrophotometer uses a 11 mm round sample cuvette.

Open time is measured as follows: a layer of 125 μm wet is applied with a bar coater on an A3 size test chart. The film is brushed through three times (on the same part) at the left of the chart. The second brush through is made after 5 minutes, the third after 10 minutes and then every 2 minutes. The open time is the time where the brush marks do not level out anymore. The open time of the second layer is measured as follows: the A3 test chart is dried at room temperature for 4 h after application of the first layer. A second layer of 125 μm wet is than applied with a bar-coater and the film is brushed through three times (on the same part) at the left of the chart. The second brush through is made at 5 minutes, the third after 10 minutes and then every 2 minutes. The open time is the time where the brush marks do not level out anymore. Open time of both first and second layer is reported in minutes.

Preparation Example 1. Oligomer Stabilized Acrylic Dispersion 1.a Synthesis of an Oligomer A 7 liter reactor was charged with 3089 grams of demineralized water and 35.44 grams of ADEKA REASOAP® SR 1025 (Adeka Corporation). The reactor contents were heated to 80° C. while creating a nitrogen atmosphere in the reactor. The nitrogen atmosphere was maintained throughout the whole polymerization process. A pre-emulsion was prepared by dissolving 99.21 grams of ADEKA REASOAP® SR 1020 in 779.8 grams of demineralized water. To this were added under stirring 1297 grams of methyl methacrylate, 231 grams of diacetone acrylamide, 164.5 grams of methacrylic acid, 294.7 grams of n-butyl methacrylate, 22.1 grams of n-octyl mercaptan and 11.34 grams of 2-mercapto ethanol.

5% of this pre-emulsion was added to the reactor. When the temperature reached 80° C., 1.754 grams of ammonium persulphate, dissolved in 85.03 grams of demineralized water, were added to the reactor. The temperature was increased to 85° C. and the remainder of the pre-emulsion was dosed over a period of 60 minutes. The beaker that contained the pre-emulsion was rinsed with 177.2 grams of demineralized water. The beaker for the initiator solution was rinsed with 42.51 grams of water. The batch was held at 85° C. for 30 minutes after which 124.8 grams of ammonia (25% strength) dissolved in 255.3 grams of water were added over a period of 30 minutes. The pH of the solution was 8.2. The batch was held at 85° C. for another 120 minutes. After this hold period, the content of the reactor were cooled to room temperature. The product was filtered through a filter-bag and stored in a polyethylene recipient. Analysis showed that the crosslinkable oligomer had a number average molecular weight of 7,026 g/mole and a weight average molecular weight of 16,493 g/mole.

1.b Synthesis of an Oligomer Stabilized Polymer

A 7 liter reactor was charged with 4549 grams of the oligomer solution from Example 1.a. and heated to 45° C. under stirring under a nitrogen atmosphere. A monomer mixture was prepared consisting of 391.3 grams of methyl methacrylate. 933.3 grams of n-butyl acrylate, 20.71 grams of divinyl benzene and 43.58 grams of styrene. 50% of this mixture was added to the reactor. After mixing for 30 minutes, 0.59 grams of tertiary-butyl hydroperoxide (70% aqueous solution) were added, followed by 50% of a solution of 0.0382 grams of Iron(II)sulfate heptahydrate, 0.0478 grams of disodium ethylenediamine tetra acetate dehydrate in 58.16 grams of demineralized water. A solution of 2.533 grams of Bruggolite® FF6M (a product of Bruggemann Chemical) in 290.5 grams of demineralized water was prepared and 43.95 grams of this solution was added to the reactor. The batch exothermed to 54.9° C. and is kept at 55° C. for 45 minutes. After the hold period, the reactor is cooled to 50° C. and the remainder of the monomers were added. The batch is kept at 50° C. for 30 minutes. The beaker that contained to monomer mixture is rinsed with 316.4 grams of demineralized water and this is added to the reactor. 2.46 grams of tertiary-butyl hydroperoxide (70% aqueous solution) and the remainder of the Iron(II)sulfate heptahydrate/disodium ethylenediamine solution was added to the reactor followed by 43.95 grams Bruggolite® FF6M solution. The batch exothermed to increase the temperature to 60° C. After 15 minutes, the remainder of the Bruggolite® FF6M solution was dosed into the reactor over a period of 30 minutes. Via an addition funnel, 64.63 grams of adipic acid dihydrazide was added. The funnel was rinsed with 316.4 grams of demineralized water. The batch was cooled to ambient temperature. To the reactor 21.31 grams of Proxel® AQ (1,2-Benzisothiazolin-3-one based biocide from Lonza Chemical) were added, followed by a rinse with 21.78 grams of demineralized water. The batch was filtered through a filter-bag and stored in a suitable recipient. The dispersion had a solids content of 39.8%, a pH of 8.1, a Brookfield viscosity of 527 mPa·s and a particle size of 49 nm. The MFFT was 17° C.

Preparation Example 2. Oligomer Stabilized Acrylic Dispersion 2.a Synthesis of an Oligomer An oligomer solution was synthesized using the same procedure from Example 1.a but with a monomer composition consisting of:

TABLE 1

| Monomer | Weight % |
| --- | --- |
| Diacetone acrylamide | 11.5% |
| Methyl methacrylate | 37.8% |
| Methacrylic acid | 8.0% |
| n-Octyl mercaptan | 1.1% |
| 2-Mercapto ethanol | 0.5% |
| n-Butyl methacrylate | 41.1% |

The crosslinkable oligomer had a $M_n$: 6,578 g/mole and $M_w$: 14,358 g/mole 2.b Synthesis of an Oligomer Stabilized Polymer.

A polymer dispersion was synthesized according to the procedure of Example 1.b using the oligomer of Example 2.a and with a monomer composition consisting of:

TABLE 2

| Monomer | Weight % |
| --- | --- |
| Allyl methacrylate | 0.5% |
| Dimethylaminoethyl methacrylate | 1.0% |
| Methyl methacrylate | 31.1% |
| n-Butyl acrylate | 67.4% |

The weight ratio between the oligomer and the polymer part in the dispersion was approximately 1/1.

The dispersed oligomer stabilized polymer dispersion had a Solids content of 40.0%, a pH of 8.7, a Particle size of 96 nm and a viscosity of 128 mPa·s Preparation Example 3. Synthesis of a Thermoplastic High MFFT Polymer Dispersion A 3 liter reactor was charged with 1,310 grams of demineralized water, 6.01 grams of sodium bicarbonate and 30.48 grams of sodium lauryl sulphate. The reactor contents were heated to 70° C. while creating a nitrogen atmosphere in the reactor. The nitrogen atmosphere was maintained throughout the whole polymerization process.

A monomer mixture was prepared by mixing 1,164 grams of methyl methacrylate with 60.5 grams of acrylic acid. When the temperature reaches 50° C., 5% of the monomer mixture is added followed by 1.33 grams of sodium persulphate dissolved in 12 grams of demineralized water when the temperature is 70° C. Rinse the addition funnel with 12 grams of demineralized water. After the end of the exothermal reaction, the reactor is heated to 85° C. The remainder of the monomer mixture is dosed into the reactor over a period of 2 hours. Simultaneously a solution of 2.65 grams of sodium persulphate is dosed over a period of 2 hours and 15 minutes. After the end of the additions, the beaker that contained the monomer-mixture is rinsed with 288 grams of demineralized water. The beaker that contained the initiator solution is rinsed with 20 grams of water. The rinsing water is added to the reactor and the batch is kept at 85° C. for an additional 30 minutes. The contents of the reactor are cooled to ambient temperature and 6 grams of Proxel® AQ are added. The product is filtered over a 60 micron filter-bag. The resulting dispersion had a solids content of 39.8%, a pH of 5.1, Brookfield viscosity of 2.3 cPa·s and a particle size of 67 nm. When cast in a PE-dish, the dispersion was not film-forming.

Preparation Example 4. Synthesis of a Low Tg Self Crosslinkable Dispersion According to EP 1 125 949

This example is according to Example 2 from EP 1 125 94961.

4.a. Preparation of the Reactive Surfactant

The reactive surfactant used in the following example was prepared as follows. 392 g of maleic anhydride (technical quality) were mixed with 767.2 g of n-dodecanol (supplied by Aldrich). The mixture was heated under a nitrogen blanket to 80° C. After about 30 min the mixture turned clear. The reaction mixture of the slightly exothermic reaction was poured out in a dish and allowed to cool to ambient temperature. After cooling a crystalline material was obtained that could easily be grounded into a fine powder. The reactive surfactant was used without further purification.

4.b. Polymer Dispersion with Reactive Surfactant

A two liter double jacketed glass reactor equipped with a two-blade stirrer, a condenser and inlets for addition of monomer pre-emulsions, initiator, and other auxiliaries, was charged with 417 g of demineralized water, 22.5 g of the reactive surfactant of Example 4.a, 1.7 g of sodium hydrogen carbonate, and 0.1 g of a 25% aqueous ammonia solution. This mixture was under stirring heated to 70° C.

In the meantime two mixtures were prepared in separate containers A and B by mixing the ingredients given in Table 3.

TABLE 3

| | Mixture 1 container A | Mixture 2 container B |
|---|---|---|
| Demineralized water | 134 | 122 |
| Reactive surfactant of Example 4.a. | 8 | 7 |
| Sodium hydrogen carbonate | 2 | 2 |
| Ammonia (25% aqueous solution) | 0.85 | 0.35 |
| Diacetone acrylamide | 21 | |
| Butyl methacrylate | | 151 |
| Butyl acrylate | 285 | |
| Methyl methacrylate | 28 | 168 |
| Dimethyl aminoethyl methacrylate | | 13 |
| Methacrylic acid | 11 | |
| Triallylcyanurate | 0.5 | 0.5 |

1.24 g of mixture 1 was taken from container A and added to the reactor. After mixing for 10 minutes a solution of 0.75 g of sodium persulfate in 7 g of demineralized water was added to the reactor. After the exothermal reaction had subsided, the monomer addition was started using the following procedure. Simultaneously the contents of container B were dosed into container A and the contents of container A were pumped into the reactor. The addition rate was controlled in order to empty both containers after 90 min. Container A was equipped with a stirrer to ensure that the contents are well mixed.

Simultaneously, to the monomer addition a solution of 1 g of sodium persulfate in 114 g of water was dosed into the reactor. During the monomer addition the temperature was allowed to raise to 85° C. After the additions had been completed, the reactor contents were kept at 85° C. for an additional 30 min. The batch was cooled down to 65° C. and a solution of 0.9 g of tert-butyl hydroperoxide (70% aqueous solution) in 3 g of demineralized water were fed to the reactor. A solution of 0.4 g of sodium formaldehyde sulfoxylate in 5 g of demineralized water was then dosed into the reactor over a period of 15 min. After the addition was completed the batch was kept at 65° C. for another 30 min. Under stirring 13 g of adipic acid dihydrazide were dissolved into the contents of the reactor. To ensure proper solution stirring and heating was continued for an additional 30 min. The batch was cooled to 30° C. and finally 2 g of a commercial biocide (Acticide™ AS, supplied by Thor Chemie) were added to the reactor and the contents were filtered through a 80 μm Perlon filter-bag to remove any coagulum. Properties of this polymer dispersion: solids content 42.2%, pH 8.0, viscosity 43 cPa·s, MFFT <5° C. and a particle size of 81 nm.

Example 5. Blend of an Oligomer Stabilized and a Non-Oligomeric Stabilized Dispersion A blend was made by pre-charging 4,513 grams of the oligomer stabilized polymer dispersion of Preparation Example 1 in a mixing vessel and slowly adding 238 grams of the polymer dispersion from Preparation Example 3.

The blend had the following properties: solids content 40.2, pH 8, Brookfield viscosity 141 mPa·s, particles size 59 nm and MFFT 18° C. The viscosity stability as a function of time and temperature of the blend was compared in comparison to that of the oligomer stabilized dispersion of Preparation Example 1 (comparative example).

TABLE 4

| Brookfield viscosity (mPa · s) | Comparative example Oligomer stabilized polymer dispersion of Preparation Ex. 1 | Example 5 |
|---|---|---|
| Initial viscosity | 527 | 141 |
| After 2 weeks at room temperature | 520 | 145 |
| After 2 weeks at 40° C. | 172 | 108 |
| After 2 weeks at 6° C. | 679 | 158 |

From Table 4 above it is clear that the viscosity stability of the polymer dispersion from Example 5 is much better than that for Example 1.

A clear coating was formulated with the polymer dispersions from preparation Example 1 and Example 5 using the following components:

TABLE 5

| Ingredients | Weight | Function |
|---|---|---|
| Binder from Example 1 or 5 | 100 | Binder |
| Water | 20 | Solvent |
| Butyl diglycol | 6 | Co-solvent |
| Byk ® 024 | 1 | Defoamer from BYK-Chemie GmbH |
| Borchi ®gel L75N/water (1:1) | 3.0 | Thickener from Borchers GmbH |

Table 6 below gives the results for the coating evaluation:

TABLE 6

| Property | Coating based on binder from Ex. 1 (Comparative) | Coating based on binder from Ex. 5 |
|---|---|---|
| Viscosity (6 rpm, mPa · s) | 1200 | 900 |
| König hardness (after drying for 16 h at 50° C.) | 111 s | 119 s |
| Gloss 20°-60° (GU) | 68-84 | 72-86 |
| Early blocking (150 μm wet film thickness) | 8 | 8 |
| Early water resistance (150 μm wet film thickness) after: | Direct/ after recovery | Direct/ after recovery |
| 1 h | 4/5 | 4-5/5 |
| 2 h | 4/5 | 4-5/5 |
| 3 h | 3/5 | 4/5 |
| 4 h | 3/5 | 4/5 |
| 5 h | 3/5 | 4/5 |
| 6 h | 3/5 | 4/5 |
| Chemical resistance 6 h (after recovery) | | |
| Water | 5 | 5 |
| Alcohol (48% aqueous) | 2 | 2 |
| Coffee | 4 | 4 |
| Ajax | 2 | 3 |

Ranking: resistance 0 = poor 5 = good, blocking: 0 = poor, 10 = good.

Example 6. Blend of an Oligomer Stabilized and a Non-Oligomeric Stabilized Dispersion A blend was made by pre-charging 4,500 grams of the polymer dispersion of Preparation Example 2 in a mixing vessel and slowly adding 238 grams of the polymer dispersion from Preparation Example 4. After blending the recipient used for the polymer dispersion from Preparation Example 4 was rinsed with 60 grams of demineralized water. This rinsing water was added to the blend.

The blend had the following properties: solids content 40.5, pH 8.4, Brookfield viscosity 100 mPa·s, particles size 112 nm and MFFT 5° C. The viscosity stability as a function of time and temperature of the blend was compared to that of Preparation Example 2 (comparative example).

TABLE 7

| Example | Temperature | Initial (at 23° C.) | 1 week | 2 weeks |
|---|---|---|---|---|
| 2 | 23° C. | 128 | 125 | 127 |
| (comparative) | 6° C. |  | 143 | 150 |
|  | 40° C. |  | 72 | 66 |
| 6 | 23° C. | 100 | 99 | 93 |
|  | 6° C. |  | 96 | 102 |
|  | 40° C. |  | 75 | 64 |

* all viscosities given in mPa · s - Spindle 62 speed 50.

A pigmented coating was prepared with the binders from Preparation Example 2 and Example 6. A pigment paste was prepared with the following ingredients:

TABLE 8

| Ingredient | Weight | Function |
|---|---|---|
| Water | 55 | Solvent |
| Tego ® Disperse 757W | 12 | Dispersing agent from Evonik Resource Efficiency GmbH |
| Byk ® 024 | 5 | Defoamer from BYK-Chemie GmbH |
| Kronos 2190 | 232 | Titanium dioxide from KRONOS INTERNATIONAL, Inc. |

The ingredients for the pigment paste were dispersed on a high speed impeller until a fineness was obtained of <10 µm. The temperature was kept below 40° C. Pigmented coatings were formulated using the ingredients listed in Table 9 below:

TABLE 9

| Ingredient | Comparative (binder of Ex. 2) | Example 6 | Function |
|---|---|---|---|
| Binder | 100 | 100 | Binder |
| Pigment paste | 45.5 | 45.5 |  |
| Water | 28 | 28 | Solvent |
| Dowanol ® DPnB | 3.0 | 3.0 | Co-solvent from Dow Chemicals |
| Byk ® 022 | 1.0 | 1.0 | Defoamer from BYK-Chemie GmbH |
| DSX ® 2000 |  | 5.0 | Thickener from BASF |
| Aquaflow ™ NHS-300 | 14.4 |  | Thickener from Ashland Specialty Chemical |

Viscosities were measured for the two paints:

TABLE 10

|  | Example 2 (comparative) | Example 6 |
|---|---|---|
| Initial viscosity (mPa · s) measured at 23° C. | | |
| 6 rpm | 1300 | 1100 |
| 60 rpm | 1200 | 950 |
| Viscosity ratio (6 rpm/60 rpm) | 1.08 | 1.16 |
| High shear 10,000 s−1 (Poise) | 2.6 | 2.4 |
| Viscosity after aging for 1 week at 40° C. (mPa · s measured at 23° C.) | | |
| 6 rpm | 1300 | 800 |
| 60 rpm | 970 | 680 |
| Viscosity ratio (6 rpm/60 rpm) | 1.34 | 1.17 |

From Table 10 above, it becomes clear that the paint based on Example 6 retains its rheological profile (as expressed by the viscosity ratio) better than that based on the binder from Preparation Example 2.

Also the gloss retention was followed according to EN 927-6, using an UVCON apparatus equipped with a UV-A 340 lamp with a peak emission at 340 nm (see EN ISO 11507:2005, lamp type 2). The results are given below:

TABLE 11

| EN 927-6 light hours | Gloss 60° | |
|---|---|---|
|  | Example 2 (comparative) | Example 6 |
| 0 | 68 | 68 |
| 168 | 68 | 68 |
| 336 | 68 | 68 |
| 672 | 66 | 66 |
| 839 | 56 | 65 |
| 1118 | 54 | 62 |

From Table 11 it becomes clear that the paint made with the binder from Example 6 has better gloss-retention at an angle of 60° than the paint prepared with the binder from Example 2.

Example 7. Oligomer Stabilized Acrylic Dispersion and Blend with a Non-Oligomer Stabilized Dispersion A polymer dispersion was synthesized according to the procedure of Example 1.b using an oligomer with a monomer composition given in Table 12 below.

TABLE 12

| Monomer | Weight % |
|---|---|
| Diacetone acrylamide | 8.87% |
| Methyl methacrylate | 65.51% |
| Methacrylic acid | 9.77% |
| n-Octyl mercaptan | 1.36% |
| 2-Mercapto ethanol | 0.70% |
| n-Butyl methacrylate | 13.79% |

The oligomer had the following molecular weights: $M_n$=5,668 g/mole and $M_w$=11,737 g/mole.

In the presence of the oligomer that was solubilized by the addition of 25% aqueous ammonia to a pH of 7.8, a core monomer mixture (Core 1) was polymerized, followed by a monomer mixture (Core 2):

TABLE 13

| Core 1: monomer mixture as follows | |
|---|---|
| Monomer | Weight % |
| Divinylbenzene | 2.95% |
| Styrene | 6.14% |
| Methyl methacrylate | 56.39% |
| n-Butyl acrylate | 34.52% |

Core 2: 100.00% n-Butyl Acrylate

The total weight of the monomers that make-up core 1 is 814.00 g.

Core 2 is the homo-polymer of n-butyl acrylate at a total weight of 812.00 g.

The oligomer constituted 49% (1,544.80 g) of the final polymer dry weight. The sum of solids of core 1+core 2 is 51% of the total dry weight (3,170.80 g).

To the reactor, 60 g of adipic acid dihydrazide and 24.8 g of Proxel® AQ were added under stirring. After that, 431.00 g of the dispersion from Preparation Example 3 were added, followed by a rinse of 60 g of demineralized water.

The final dispersion was filtered over a 60 micron sieve and stored in a polyethylene container.

The resulting aqueous dispersion had a solids content of 39.2%, a pH of 7.8, a particle size of 62 nm, a transparency of 52.7 and a viscosity of 123 mPa·s. The minimal film-formation temperature was 28° C.

Example 8 (Comparative)

Experiment 7 was repeated but without the addition of the polymer dispersion from Preparation Example 3. This dispersion had a solids content of 40.10%, pH of 7.80, a transparency of 66.4%, Brookfield viscosity of 190 mPa·s, particle size of 55 nm and an MFFT of 14° C.

Comparison of viscosity stability of Examples 7 and 8.

The dispersion of Comparative Example 8 was adjusted to the same viscosity as the dispersion of Example 7 using demineralized water. The dispersions were aged at 6° C. and 23° C. After allowing the sample to return to ambient temperature, the viscosity was measured. In Table 14 below, the difference in viscosity as a function of time is given.

TABLE 14

| | Viscosity difference (mPa · s) | | | |
|---|---|---|---|---|
| | 6° C. | | 23° C. | |
| Ageing time | ex. 7 | ex. 8 (comp) | ex. 7 | ex. 8 (comp) |
| Initial | 0 | 0 | 0 | 0 |
| 3 days | 5 | 13 | −8 | 13 |
| 1 week | 7 | 30 | −7 | 18 |
| 2 weeks | 2 | 30 | −7 | 13 |
| 4 weeks | 14 | 40 | −7 | 9 |
| 8 weeks | 18 | 42 | 1 | 19 |

From Table 14 above it is clear that the dispersion according to the invention has a much improved viscosity stability at both low and ambient temperature.

Example 9. Preparation of an Aqueous Polymeric Vinyl Dispersion Stabilized by Surfactants In an emulsion polymerization reactor the pre-emulsion was made as follows: 454 grams of water and 5 grams of an anionic polymerizable surfactant (ADEKA REASOAP® SR-1025, supplied by Adeka) was added and heated to 70° C. In the feed-tank a mixture of 117 grams of water, 22.8 grams of the anionic polymerizable surfactant ADEKA REASOAP® S-1025 and 0.30 grams of sodium lauryl sulphate were mixed for 5 minutes. The monomer pre-emulsion was prepared by adding the following raw materials in the feed tank: 109.5 grams of methyl methacrylate, 24.2 grams of VISIOMER® ETMA (Ethyltriglycol methacrylate supplied by Evonik), 24.2 grams of methacrylic acid, 145.7 grams of n-butyl methacrylate, 3.56 grams octyl mercaptan and 1.75 grams of 2-mercapto ethanol. Emulsify the feed until a stable pre-emulsion was obtained.

Add 5 weight % of the pre-emulsion to the reactor. Heat the reactor to 80° C. Add a solution of 6.3 grams of water and 0.30 grams of ammonium persulphate to the reactor and wait for 5 minutes. Heat the reactor to 85° C., start feeding the pre-emulsified monomers from the feed-tank and separately the initiator solution of 15.2 grams of water and 0.75 grams of ammonium persulphate. The reaction temperature was 85±2° C. The monomer feed dosing takes 60 minutes. The initiator feed was 70 minutes. The following finishing steps were performed: rinse the feed tank with 21.0 grams of water and the initiator tank with 6.7 grams of water. Maintain the temperature for another 60 minutes after the feed has been completed. Cool the batch to 65° C., add a slurry of 4.0 grams of water and 0.75 grams of butyl hydroperoxide (70 weight % solution in water to the reactor and dose the solution 16.0 gram of water and 0.35 gram sodium formaldehyde sulphoxylate over a 15 minutes period. Keep the temperature for another 30 minutes. Cool to 25° C. At 25° C. add a solution of 3.1 gram Proxel® AQ in 4.0 grams water, rinse with 4.0 grams of water and add the solution of 1.65 gram of 25 weight % ammonia solution in 4.0 grams of water. Rinse with 4.0 grams of water. An aqueous polymeric vinyl dispersion polymer having both ethylene oxide and carboxylic acid functionality was obtained with the following specifications: Solids content=32%; pH=7.5; grit <100 ppm; residual monomer <100 ppm. Particle Size=122 nm. The molecular weight was determined by gel permeation chromatography using THF with 2% acetic acid as eluent: $M_n$=5,000 and $M_w$=13,200.

Example 10. Blend of an Oligomer Stabilized Dispersion and a Non-Oligomer Stabilized Polymer Dispersion To 700 parts of the carbonyl-functional dispersion of Example 1, 300 parts of the dispersion from Example 9 are added and mixed well. The resulting blend was composed of 25% solids from the polymer from Example 9 and 75% of solids from the polymer from Example 1. The solids content of the dispersion thus obtained was 37.4%, the pH was 7.75, particle size (Z-average mean) was 114 nm and the Brookfield viscosity was 32 mPa·s measured according to ASTM D2196.

Example 11. Blend of an Oligomer Stabilized Dispersion and a Non-Oligomer Stabilized Polymer Dispersion To 700 parts of the carbonyl-functional dispersion of Example 8, 300 parts of the dispersion from Example 9 are added and mixed well. The resulting blend was composed of 25% of first polymer solids and 75% of second polymer solids.

Example 12. Blend of an Oligomer Stabilized Dispersion and Two Non-Oligomer Stabilized Dispersions To 95 parts of the dispersion blend of Example 10, 5 parts of the dispersion from Example 3 was added.

Example 13. Blend of an Oligomer Stabilized Dispersion and Two Non-Oligomer Stabilized Dispersions To 100 parts of the dispersion blend of Example 11, 5 parts of the dispersion from Example 3 was added.

Examples 14 and 17 (Comparative) and Examples 15, 16, 18, 19 and 21 (According to the Invention. White Paint Formulations White paint formulations were prepared as follows.
A mill base was prepared by mixing the following ingredients:

TABLE 15

| Ingredient | Weight | Function | Supplier |
|---|---|---|---|
| Water | 42.2 | Solvent | |
| Propylene glycol | 10 | Co-solvent | |
| Disperbyk ® 190 | 11.4 | Dispersing aid | BYK Chemie |
| Byk ® 024 | 4.1 | Anti-foaming agent | BYK Chemie |
| Kronos ® 2190 | 189 | Titanium dioxide | Kronos |

This mixture was dispersed on a high speed impeller until a fineness is obtained of <10 μm. During the dispersing the temperature was not allowed to rise above 40° C. With this mill base a white paints with a pigment volume concentration (PVC) of 17.6 was formulated according to Table 16 below.

TABLE 16

| Example | 14 comp | 15 | 16 | 17 comp | 18 | 19 | 20 | 21 |
|---|---|---|---|---|---|---|---|---|
| Dispersion from ex. 1 | 89.5 | — | — | — | — | — | — | — |
| Dispersion from ex. 10 | — | 95.5 | — | — | — | — | — | — |
| Dispersion from ex. 5 | — | — | 89.5 | — | 89.5 | — | — | — |
| Dispersion from ex. 8 | — | — | — | 89.5 | — | — | — | — |
| Dispersion from ex. 7 | — | — | — | — | — | 89.5 | — | — |
| Dispersion from ex. 12 | — | — | — | — | — | — | 95.5 | — |
| Dispersion from ex. 13 | — | — | — | — | — | — | — | 95.5 |
| Mill-base | 38.5 | 38.5 | 38.5 | 38.5 | 38.5 | 38.5 | 38.5 | 38.5 |
| Dowanol ® DPM* | 4 | 4 | 4 | 4 | 4 | 4 | 4 | 4 |
| Byk ® 024** | 1.5 | 1.5 | 1.5 | 1.5 | 1.5 | 1.5 | 1.5 | 1.5 |
| Water | 11.8 | 11.8 | 11.8 | 11.8 | 11.8 | 11.8 | 6.8 | 6.8 |
| Rheovis ® PE 1320 NC*** | 3.0 | 5.2 | 3.4 | 3.6 | 3.2 | 3.0 | 4.5 | 4.1 |
| Borchi ® Gel L 75 N****/ water (1:1) | 1.2 | 1.2 | 0.8 | 0.7 | 0.7 | 0.5 | 1.3 | 1.2 |

*Co-solvent supplied by DowDupont.
**supplied by Byk Chemie (Altana Group), is a mixture of foam-destroying polysiloxanes and hydrophobic solids in polyglycol.
***supplied by BASF, is a polyether solution in water/ butyldiglycol. Used as a Newtonian rheology modifier for aqueous coatings.
****supplied by Borchers. Hydrophobically modified ethoxylate urethane (HEUR)

TABLE 17

Paint evaluation results.

| Property | ex. 14 comp | ex. 15 | ex. 16 | ex. 17 comp | ex. 18 | ex. 19 | ex. 20 | ex. 21 | ex. 22 | ex. 23 |
|---|---|---|---|---|---|---|---|---|---|---|
| Brookfield viscosity 6-60 rpm (mPa · s, 23° C.)* | 2000 / 1940 | 2000 / 1960 | 2400 / 2320 | 2600 / 2540 | 1800 / 1670 | 2400 / 2320 | 1700 / 1660 | 1800 / 1760 | 2500 / 2260 | 2500 / 2400 |
| High shear viscosity (Poise, @ 10,000 s-1, Cone & plate) | 2.5 | 2.8 | 2.5 | 3.1 | 2.6 | 3.2 | 2.3 | 2.4 | 3.0 | 2.8 |
| Open time first layer 22° C., 53% RH (min) | 16 | 18 | 18 | 16 | 16 | 16 | 18 | 18 | 18 | 20 |
| Dry layer thickness (μm) | 30 | 35 | 25 | 25 | 25 | 25 | 25 | 25 | 25 | 25 |
| Open time second layer (min) | 10 | 14 | 16 | 10 | 16 | 12 | 14 | 16 | 14 | 20 |
| Dry layer thickness (μm) | 68 | 65 | 55 | 75 | 60 | 70 | 65 | 70 | 75 | 70 |
| Open time difference (min) | 6 | 4 | 2 | 6 | 0 | 4 | 4 | 2 | 4 | 0 |

*Spindle 62 speed 50 rpm at 23° C..

As can be clearly seen from Table 17 the paints from the examples according to the invention have much improved open time of at least 18 minutes compared to the paint from comparative examples. Furthermore the difference between the open time of the first and second layer is not higher than 4 minutes.

The invention claimed is:

1. A crosslinkable aqueous vinyl polymer composition comprising:
a) from 70 to 97.5 weight % of a crosslinkable oligomer stabilized dispersion PD1 of vinyl polymer P1, PD1 comprising, based on the polymer weight of vinyl polymer dispersion PD1:
  i) from 20 to 60 weight % on polymer solids in PD1 of a water-soluble or water-dispersible crosslinkable oligomer OL obtained by emulsion polymerizing a monomer mixture comprising:
    1) At least one acid functional ethylenically unsaturated monomer M1,
    2) At least one ethylenically unsaturated monomer M2 with functionality for crosslinking upon film-formation, other than M1,
    3) At least one ethylenically unsaturated monomer M3 other than M1 and M2,
    4) optionally, one or more multifunctional ethylenically unsaturated monomers M4 for pre-crosslinking, and
  ii) from 40 to 80 weight % on polymer solids in PD1 of at least one vinyl polymer P1, the vinyl polymer P1 having a number average molecular weight higher than 60,000 g/mole, determined according to ASTM D3536 and ASTM D3593, prepared by emulsion polymerizing, in the presence of the water-soluble or water-dispersible crosslinkable oligomer OL, a monomer mixture comprising:
    1) Optionally at least one acid functional ethylenically unsaturated monomer M1',
    2) Optionally one or more ethylenically unsaturated monomers M2' with functionality for crosslinking upon film-formation, other than M1',
    3) At least one ethylenically unsaturated monomer M3' other than M1' and M2', and
    4) optionally, one or more multifunctional ethylenically unsaturated monomers M4' for pre-crosslinking,
  wherein the sum of i) and ii) is 100 wt %,
b) from 2 to 29.5 weight % of at least one non-oligomer stabilized dispersion PD2 of vinyl polymer P2, PD2 obtained by emulsion polymerizing a monomer mixture comprising:
  1) at least one acid functional ethylenically unsaturated monomer M1",
  2) optionally one or more ethylenically unsaturated monomers M2" with functionality for crosslinking upon film-formation, other than M1",
  3) at least one ethylenically unsaturated monomer M3" other than M1" and M2", and
  4) optionally, one or more multifunctional ethylenically unsaturated monomers M4" for pre-crosslinking,
  5) optionally, in the presence of a conventional non-oligomeric, non-crosslinkable surfactant, optionally a copolymerizable surfactant,
c) from 0.5 to 28 weight % of at least one crosslinker X reactive with the functional groups of monomers M2 of OL and optionally with the functional groups of monomers M2' of P1 and/or M2" of P2,
based on the total weight of a), b) and c), wherein the total weight of a), b) and c) is 100 wt % of the crosslinkable aqueous vinyl polymer composition.

2. The composition according to claim 1, wherein the oligomer OL has an acid value of at least 45 mg KOH/g.

3. The composition according to claim 1, wherein the oligomer OL has a number average molecular weight of from 500 to 50,000 g/mole.

4. The composition according to claim 1, wherein the oligomer OL is derived from a monomer system comprising 1-45 weight % of monomer(s) M1, 0.5 to 20 weight % of crosslinking monomer(s) M2, and 98.5-50 weight % of monomer(s) M3.

5. The composition according to claim 1, wherein vinyl polymer P1 is derived from a monomer system comprising 0 to 5 weight % of monomer(s) M1', 0 to 10 weight % of crosslinking monomer(s) M2', 80 to 100 weight % of monomer M3', and 0 to 5 weight % of monomer M4'.

6. The composition according to claim 1, wherein the crosslinkable oligomer stabilized dispersion PD1 of vinyl polymer P1 comprises a vinyl polymer P1A and a vinyl polymer PIB different from polymer PIA.

7. The composition according to claim 6, wherein the vinyl polymer P1A has a Tg which is different from the Tg of vinyl polymer PIB by at least 40° C.

8. The composition according to claim 6, wherein vinyl polymer P1A is derived from a monomer system comprising 0 to 5 weight % of monomer(s) M1', 0 to 10 weight % of crosslinking monomer(s) M2', 80 to 100 weight % of non-acid functional, non-crosslinking monomer(s) M3' different from M1' and M2', and 0 to 5 weight % of monomer M4', and polymer PIB is derived from a monomer system comprising less than 1 weight % of monomer(s) M1', less than 1 weight % of monomer(s) M2', and 98 to 100 weight % of monomer M3', and 0 weight % of monomer M4'.

9. The composition according to claim 1, wherein the vinyl polymer P2 contains more than 2.5 weight % of monomer M2", has a glass-transition temperature Tg between −35° C. and 75° C., a particle size of at most 100 nm (Z-average mean according to ISO13321), a number average molecular weight of at least 100,000 g/mole, determined according to ASTM D3536 and ASTM D3593, and a MFFT below 10° C., determined according to ASTM D2354-10.

10. The composition according to claim 1, wherein the vinyl polymer P2 has a glass-transition temperature of at least 80° C., a particle size of at most 100 nm (Z-average mean according to ISO13321), a number average molecular weight of at least 100,000 g/mole, determined according to ASTM D 3536 and ASTM D 3593, and is not film-forming at ambient temperature.

11. The composition according to claim 1, wherein the vinyl polymer P2 has a glass-transition temperature between 0 and 100° C., a particle size between 100 and 200 nm (Z-average mean according to ISO13321), a number average molecular weight of 4,000 to 50,000 g/mole, determined according to ASTM D 3536 and ASTM D 3593, and contains 6 to 10 weight % of monomer M2".

12. The composition according to claim 1, wherein the acid functional monomers M1, M1' and M1" are, each independently, selected from the group consisting of acrylic acid, methacrylic acid, and mixtures thereof.

13. The composition according to claim 1, wherein the monomers M2, M2' and, M2", are, each independently, selected from the group consisting of acetoacetoxyethyl methacrylate, diacetone acrylamide, and mixtures thereof.

14. A crosslinkable aqueous vinyl polymer composition comprising:
  a) from 70 to 97.5 weight % of a crosslinkable oligomer stabilized dispersion PD1 of vinyl polymer P1, PD1 comprising, based on the polymer weight of vinyl polymer dispersion PD1:
    i) from 25 to 55 weight % on polymer solids in PD1 of a water-soluble or water-dispersible crosslinkable oligomer OL obtained by emulsion polymerizing a monomer mixture comprising:
      1) At least one acid functional ethylenically unsaturated monomer M1,
      2) At least one ethylenically unsaturated monomer M2 with functionality for crosslinking upon film-formation, other than M1,
      3) At least one ethylenically unsaturated monomer M3 other than M1 and M2,
      4) Optionally, one or more multifunctional ethylenically unsaturated monomers M4 for pre-crosslinking, and
    ii) from 40 to 80 weight % on polymer solids in PD1 of at least one vinyl polymer P1, the vinyl polymer P1 having a number average molecular weight higher than 60,000 g/mole, determined according to ASTM D3536 and ASTM D3593, prepared by emulsion polymerizing, in the presence of the water-soluble or water-dispersible crosslinkable oligomer OL, a monomer mixture comprising:
      1) Optionally at least one acid functional ethylenically unsaturated monomer M1',
      2) Optionally one or more ethylenically unsaturated monomers M2' with functionality for crosslinking upon film-formation, other than M1',
      3) At least one ethylenically unsaturated monomer M3' other than M1' and M2', and
      4) optionally, one or more multifunctional ethylenically unsaturated monomers M4' for pre-crosslinking,
    wherein the sum of i) and ii) is 100 wt %,
  b) from 2 to 29.5 weight % of at least one non-oligomer stabilized dispersion PD2 of vinyl polymer P2, PD2 obtained by emulsion polymerizing a monomer mixture comprising:
    1) At least one acid functional ethylenically unsaturated monomer M1",
    2) Optionally one or more ethylenically unsaturated monomers M2" with functionality for crosslinking upon film-formation, other than M1",
    3) At least one ethylenically unsaturated monomer M3" other than M1" and M2", and
    4) optionally, one or more multifunctional ethylenically unsaturated monomers M4" for pre-crosslinking,
    5) optionally, in the presence of a conventional non-oligomeric, non-crosslinkable surfactant, optionally a copolymerizable surfactant,
  c) from 0.5 to 28 weight % of at least one crosslinker X reactive with the functional groups of monomers M2 of OL and optionally with the functional groups of monomers M2' of P1 and/or M2" of P2,
  based on the total weight of a), b) and c), wherein the total weight of a), b) and c) is 100 wt % of the crosslinkable aqueous vinyl polymer composition,
  wherein the monomers M3, M3' and M3" are, each independently, selected from the group consisting of vinyl monomers, esters of acrylic acid and methacrylic acid of formula $CH_2=CR1\text{-}C(O)OR2$ wherein R1 is H or methyl and R2 is optionally substituted C1 to C20 alkyl, cycloalkyl, aryl or (alkyl) aryl, and mixtures thereof.

15. The composition according to claim 1, wherein the crosslinker X is selected from the group consisting of diamines, polyamines, dihydrazides, polyhydrazides, and mixtures thereof.

16. An aqueous coating composition comprising:
  at least one aqueous composition according to claim 1; and
  at least one or more conventional ingredients selected from the group consisting of pigments, dyes, emulsifiers, surfactants, plasticizers, thickeners, heat stabilizers, levelling agents, anti-cratering agents, fillers, sedimentation inhibitors, UV absorbers, antioxidants, drier salts, organic co-solvents, wetting agents, and mixtures thereof.

17. The composition according to claim 1, wherein the at least one vinyl polymer P1 is prepared by emulsion polymerizing, in the presence of the water-soluble or water-dispersible crosslinkable oligomer OL, a monomer mixture comprising:
  1) Optionally at least one acid functional ethylenically unsaturated monomer M1',
  2) Optionally one or more ethylenically unsaturated monomers M2' with functionality for crosslinking upon film-formation, other than M1',
  3) At least one ethylenically unsaturated monomer M3' other than M1' and M2', and
  4) optionally, one or more multifunctional ethylenically unsaturated monomers M4' for pre-crosslinking in an amount less than 5 weight %,
  wherein the sum of i) and ii) is 100 wt %.

18. The composition according to claim 1, wherein the at least one non-oligomer stabilized dispersion PD2 of vinyl polymer P2 is obtained by emulsion polymerizing a monomer mixture comprising:
  1) At least one acid functional ethylenically unsaturated monomer M1",
  2) Optionally one or more ethylenically unsaturated monomers M2" with functionality for crosslinking upon film-formation, other than M1",
  3) At least one ethylenically unsaturated monomer M3" other than M1" and M2", and
  4) optionally, one or more multifunctional ethylenically unsaturated monomers M4" for pre-crosslinking in an amount less than 5 weight %,
  5) optionally, in the presence of a conventional non-oligomeric, non-crosslinkable surfactant, optionally a copolymerizable surfactant.

* * * * *